(12) United States Patent
Tadakuma et al.

(10) Patent No.: US 9,722,388 B2
(45) Date of Patent: Aug. 1, 2017

(54) MULTI-CORE OPTICAL AMPLIFYING FIBER DEVICE AND MULTI-CORE OPTICAL FIBER AMPLIFIER

(71) Applicant: FURUKAWA ELECTRIC CO., LTD., Tokyo (JP)

(72) Inventors: Masateru Tadakuma, Tokyo (JP); Koichi Maeda, Tokyo (JP); Yukihiro Tsuchida, Tokyo (JP); Shigehiro Takasaka, Tokyo (JP); Ryuichi Sugizaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/976,922

(22) Filed: Dec. 21, 2015

(65) Prior Publication Data

US 2016/0118762 A1    Apr. 28, 2016

Related U.S. Application Data

(63) Continuation of application No. PCT/JP2014/066473, filed on Jun. 20, 2014.

(30) Foreign Application Priority Data

Jun. 21, 2013   (JP) .................................. 2013-131069

(51) Int. Cl.
*H01S 3/067*        (2006.01)
*G02B 6/02*         (2006.01)
(Continued)

(52) U.S. Cl.
CPC ...... *H01S 3/06737* (2013.01); *H01S 3/06758* (2013.01); *H01S 3/06783* (2013.01);
(Continued)

(58) Field of Classification Search
CPC ............ H01S 3/06737; H01S 3/06758; H01S 3/06783; G02B 6/02042
See application file for complete search history.

(56) References Cited

U.S. PATENT DOCUMENTS 6,236,500 B1 *   5/2001   Suzuki ............... H01S 3/06754
                                                         359/337.5
8,693,088 B2     4/2014   Fini et al.
(Continued)

FOREIGN PATENT DOCUMENTS

JP    61-141407    6/1986
JP    61-141408    6/1986
(Continued)

OTHER PUBLICATIONS

International Search Report issued Sep. 22, 2014 in PCT/JP2014/066473 filed Jun. 20, 2014 (with English translation).
(Continued)

*Primary Examiner* — Eric Bolda
(74) *Attorney, Agent, or Firm* — Oblon, McClelland, Maier & Neustadt, L.L.P.

(57) ABSTRACT

A multi-core optical amplifying fiber device includes a plurality of multi-core optical amplifying fibers including a plurality of core portions doped with amplification medium and a cladding portion formed at outer peripheries of the plurality of core portions; and a connection portion connecting the core portions of the plurality of multi-core optical amplifying fibers to one another. The connection portion connects the core portions to restrain deviation, between every connected core portions, of amplification gain for a total length of the core portions connected one another.

12 Claims, 11 Drawing Sheets

(51) Int. Cl.
*H01S 3/10* (2006.01)
*H01S 3/094* (2006.01)
*H01S 3/16* (2006.01)

(52) U.S. Cl.
CPC ...... *H01S 3/10023* (2013.01); *G02B 6/02042* (2013.01); *H01S 3/06766* (2013.01); *H01S 3/094003* (2013.01); *H01S 3/094007* (2013.01); *H01S 3/094019* (2013.01); *H01S 3/094038* (2013.01); *H01S 3/094061* (2013.01); *H01S 3/1608* (2013.01); *H01S 2301/04* (2013.01)

(56) References Cited

U.S. PATENT DOCUMENTS

| | | | |
|---|---|---|---|
| 9,140,850 B2 | 9/2015 | Mimura et al. | |
| 2011/0274435 A1 | 11/2011 | Fini et al. | |
| 2011/0279888 A1* | 11/2011 | Fini | G02B 6/2835 359/334 |
| 2013/0114130 A1 | 5/2013 | Stampoulidis et al. | |
| 2013/0136404 A1 | 5/2013 | Feuer | |
| 2013/0236175 A1* | 9/2013 | Sethumadhavan | H04J 14/04 398/55 |
| 2014/0022627 A1* | 1/2014 | Takushima | H01S 3/06783 359/341.3 |
| 2014/0036351 A1* | 2/2014 | Fini | G02B 6/2856 359/341.31 |
| 2014/0168756 A1* | 6/2014 | Zhu | H01S 3/06754 359/341.5 |
| 2014/0240819 A1 | 8/2014 | Tsuchida et al. | |
| 2014/0307304 A1* | 10/2014 | Zhu | G02B 6/02347 359/341.3 |
| 2015/0222356 A1* | 8/2015 | Kawanishi | H04J 14/04 398/43 |

FOREIGN PATENT DOCUMENTS

| | | |
|---|---|---|
| JP | 10-107351 A | 4/1998 |
| JP | 10-242548 A | 9/1998 |
| JP | 2000-208839 | 7/2000 |
| JP | 2013-522914 | 6/2013 |
| WO | WO 2012/173271 A1 | 12/2012 |
| WO | WO 2013/033703 A1 | 3/2013 |
| WO | WO 2013/051655 A1 | 4/2013 |
| WO | WO 2013/090549 A2 | 6/2013 |

OTHER PUBLICATIONS

Written Opinion issued Sep. 22, 2014 in PCT/JP2014/066473 filed Jun. 20, 2014.

K. S. Abedin, et al., "Amplification and noise properties of an erbium-doped multicore fiber amplifier", Optics Express, vol. 19, (17), 2011, 7 pgs.

Yu Mimura, et al., "Batch Multicore Amplification with Cladding-Pumped Multicore EDF", ECOC Technical Digest, Tu.4.F.1, 2012, 3 pgs.

Yukihiro Tsuchida, et al., "Simultaneous 7-Core Pumped Amplification in Multicore EDF through Fibre Based Fan-In/Out", ECOC Technical Digest, Tu.4.F.2, 2012, 3 pgs.

Extended European Search Report issued Feb. 9, 2017 in Patent Application No. 14813141.0.

* cited by examiner

FIG.1
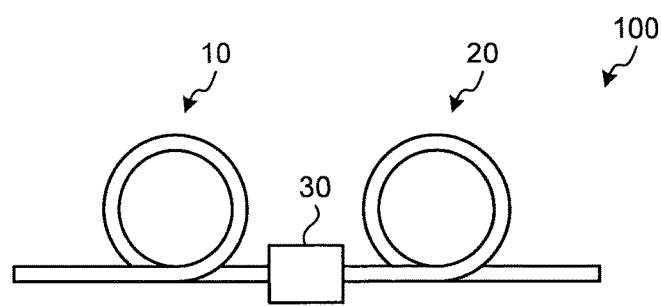
FIG.2A                FIG.2B
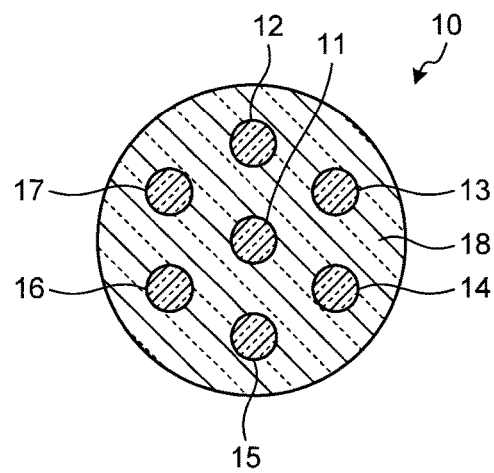  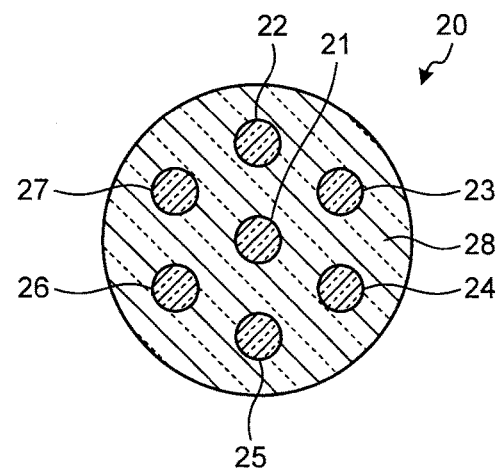

MULTI-CORE OPTICAL AMPLIFYING FIBER DEVICE AND MULTI-CORE OPTICAL FIBER AMPLIFIER

CROSS-REFERENCE TO RELATED APPLICATION

This application is a continuation of PCT International Application No. PCT/JP2014/066473 filed on Jun. 20, 2014 which claims the benefit of priority from Japanese Patent Application No. 2013-131069 filed on Jun. 21, 2013, the entire contents of which are incorporated herein by reference.

BACKGROUND OF THE INVENTION

1. Field of the Invention

The present invention relates to a multi-core optical amplifying fiber device and a multi-core optical fiber amplifier using this.

2. Description of the Related Art

A multi-core optical fiber is studied in which a plurality of core portions are formed in one cladding portion. This multi-core optical fiber is used for the purpose of conducting a so-called Space Division Multiplexing communication in which signal lights are propagated in the plurality of core portions although the multi-core optical fiber is of an outer diameter similar to that of a single-core optical fiber in which a core portion is formed in a cladding portion. By using Space Division Multiplexing communication as such, it is possible to increase transmission capacity per one optical fiber as a transmission path. When configuring a multi-core optical fiber optical transmission system using the multi-core optical fiber as such, a signal light amplifier for compensating for transmission loss in the transmission path is necessary similarly to using a single-core optical fiber as a transmission path. Several optical amplifiers have been proposed for amplifying signal lights transmitted through the plurality of core portions in a multi-core optical fiber (see K. S. Abedin et al., "Amplification and noise properties of an erbium doped multicore fiber amplifier", Optics Express, vol. 19, no. 17, pp. 16715, 2011, Y. Mimura et al., "Batch Multicore Amplification with Cladding-Pumped Multicore EDF", in Proc.ECOC2012, Tu.4.F.1, (2012), and Y. Tsuchida et al., "Simultaneous 7-Core Pumped Amplification in Multicore EDF through Fibre Based Fan-In/Out," in Proc.ECOC2012, Tu. 4. F. 2 (2012)).

Among them, a multi-core optical fiber amplifier using a rare-earth-doped multi-core optical fiber having a plurality of cores which are doped with rare-earth metal as an amplification medium is a technology of which introduction to an optical transmission system is under investigation due to superior affinity with a multi-core optical fiber constituting the multi-core optical fiber transmission path. Similarly to the conventional optical transmission system, a multi-core optical fiber optical transmission system as well can use wavelength division multiplexing (WDM) transmission technology by which a plurality of signal lights having different wavelengths are multiplexed to be transmitted.

SUMMARY OF THE INVENTION

It is an object of the present invention to at least partially solve the problems in the conventional technology.

In accordance with one aspect of the present invention, a multi-core optical amplifying fiber device includes: a plurality of multi-core optical amplifying fibers including a plurality of core portions doped with amplification medium and a cladding portion formed at outer peripheries of the plurality of core portions; and a connection portion connecting the core portions of the plurality of multi-core optical amplifying fibers to one another. The connection portion connects the core portions to restrain deviation, between every connected core portions, of amplification gain for a total length of the core portions connected one another.

In accordance with another aspect of the present invention, a multi-core optical fiber amplifier includes: the multi-core optical amplifying fiber device according to one aspect of the present invention; a pumping light source outputting a pumping light made be inputted to the core portion of the multi-core optical amplifying fiber included in the multi-core optical amplifying fiber device; and an optical multiplexer making the pumping light be inputted to the core portions of the multi-core optical amplifying fiber.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic view of configuration of a multi-core optical amplifying fiber device according to Embodiment 1;

FIG. 2A, 2B are schematic cross-sectional views of the multi-core optical amplifying fibers shown in FIG. 1;

DETAILED DESCRIPTION OF THE PREFERRED EMBODIMENTS

Figure 3:
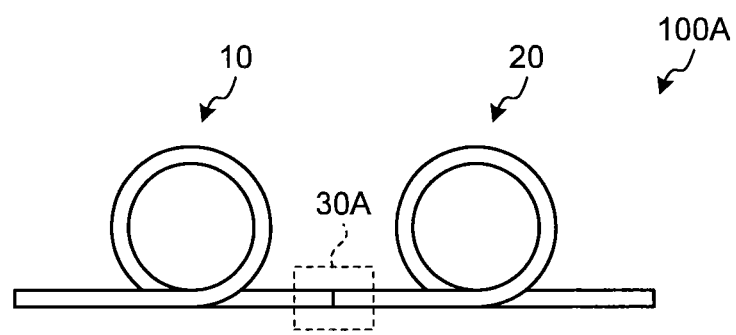
FIG. 3 is a schematic view of configuration of a multi-core optical amplifying fiber device according to Embodiment 2.

Hereafter, embodiments of a multi-core optical amplifying fiber device and a multi-core optical fiber amplifier according to the present invention will be explained with reference to the drawings. The embodiments do not limit the present invention. In all the drawings, identical or corresponding elements are given same reference numerals. It should be noted that the drawings show schematic examples. Accordingly, a relationship between respective elements may be different from real values. Among the drawings, there may be parts where the relationships and ratios of the shown sizes are different from one another.

In a multi-core optical fiber amplifier for use when conducting a Space Division Multiplexing communication by using the multi-core optical fiber transmission path, it is desirable that output power of a signal light from each core portion be identical. The reason for it is that, if a difference of power is produced in signal lights being transmitted between core portions of the multi-core optical fiber transmission path, a difference of change occurs in quality of the signal light between the core portions, and results in a situation where signal lights are transmitted desirably in some core portions but signal lights deteriorate badly in other core portions. On the other hand, in optical amplification using a multi-core optical amplifying fiber using a rare-earth metal as an amplification medium, amplification gain in each core portion may have deviation sometimes. Because it is that there are variation in amount of rare-earth metal doped into each core portion and variation in power of pumping light inputted to each core portion because of error or the like in production of the multi-core optical amplifying fiber.

In contrast, according to the embodiment described below, an effect of restraining deviation of amplification gain at each core portion is obtained.

Embodiment 1

FIG. 1 is a schematic view of configuration of a multi-core optical amplifying fiber device according to Embodiment 1. A multi-core optical amplifying fiber device 100 according to present Embodiment 1 includes a multi-core optical amplifying fiber 10, a multi-core optical amplifying fiber 20, and a connection portion 30 connecting the multi-core optical amplifying fiber 10 to the multi-core optical amplifying fiber 20.

FIG. 2A, 2B are schematic cross-sectional views of the multi-core optical amplifying fibers 10 and 20 shown in FIG. 1. FIG. 2A shows the cross section of the multi-core optical amplifying fiber 10, and FIG. 2B shows the cross section of the multi-core optical amplifying fiber 20.

As shown in FIG. 2A, the multi-core optical amplifying fiber 10 includes seven core portions 11 to 17, and a cladding portion 18 formed at outer peripheries of the core portions 11 to 17. In the cladding portion 18, the core portion 11 is disposed at an approximate center axis of the multi-core optical amplifying fiber 10. The core portions 12 to 17 are disposed around the core portion 11 so that the core portions 12 to 17 form a regular hexagon of which the core portion 11 is centered.

The core portions 11 to 17 are made of silica-based glass and are doped with rare-earth metal as an amplification medium and with refractive-index-adjusting dopant. The rare-earth metal is, for example, erbium (Er) or ytterbium (Yb). The refractive-index-adjusting dopant is, for example, germanium (Ge). The core portions 11 to 17 may be doped with a dopant such as aluminum (Al) or the like for improving amplification characteristics of the amplification medium. The cladding portion 18 is configured by material, for example, made of silica glass not containing the refractive-index-adjusting dopant, of which refractive index is lower than those of the core portions 11 to 17.

Similarly, as shown in FIG. 2B, the multi-core optical amplifying fiber 20 includes seven core portions 21 to 27, and a cladding portion 28 formed at outer peripheries of the core portions 21 to 27. In the cladding portion 28, the core portion 21 is disposed at an approximate center axis of the multi-core optical amplifying fiber 20. The core portions 22 to 27 are disposed around the core portion 21 so that the core portions 22 to 27 form a regular hexagon of which the core portion 21 is centered.

The core portions 21 to 27 are made of silica-based glass and is doped with rare-earth metal as an amplification medium and with refractive-index-adjusting dopant. The rare-earth metal is, for example, erbium (Er) or ytterbium (Yb). The refractive-index-adjusting dopant is, for example, germanium (Ge). The core portions 21 to 27 may be doped with dopant such as aluminum (Al) or the like for improving amplification characteristics of the amplification medium. The cladding portion 28 is configured by material of which refractive index is lower than those of the core portions 21 to 27 such as silica glass not containing the refractive-index-adjusting dopant.

The connection portion 30 connects any one of the core portions 11 to 17 of the multi-core optical amplifying fiber 10 to any one of the core portions 21 to 27 of the multi-core optical amplifying fiber 20 each other.

The connection portion 30 will be explained more specifically. In a case where a pumping light (a pumping light at a wavelength of 980 nm band and 1480 nm band if the amplification medium is, for example, Er), at a wavelength which is capable of optical pumping of the doped amplification medium, is input, the amplification media of the core portions 11 to 17 of the multi-core optical amplifying fiber 10 and the core portions 21 to 27 of the multi-core optical amplifying fiber 20 are of optically excited states which are capable of optical amplification. When a signal light is input to the core portions 11 to 17 and 21 to 27 in this state at a wavelength at which the amplification medium is capable of optical amplification (a signal light at a wavelength of 1550 nm band if the amplification medium is, for example, Er), the core portions 11 to 17 and 21 to 27 make the input signal light be subjected to optical amplification.

In this multi-core optical amplifying fiber device 100, when signal lights are input to the core portions 11 to 17, that are in a state of capable of optical amplification, respectively from one end, at a left-hand-side in the drawing, of the multi-core optical amplifying fiber 10, each signal light is propagated while being subjected to optical amplification by each core portion, inputted to the core portions 21 to 27, that are in a state of capable of optical amplification, of the multi-core optical amplifying fiber 20, connected to each one of the core portions 11 to 17 via the connection portion 30, then each signal light is propagated while being subjected to optical amplification by each core portion and outputted from one end, at a right-hand-side in the drawing, of the multi-core optical amplifying fiber 20.

In general, amplification gain characteristics of an amplification optical fiber can be indicated by a propagation equation as follows:

$$dP(\lambda,z)/dz = \{g^*(\lambda) \cdot n_2(z) - \alpha(\lambda) \cdot n_1(z)\} \cdot P(\lambda,z)$$

where $P(\lambda,z)$ indicates power of a light at wavelength $\lambda$ at a position z in the longitudinal direction of the amplification optical fiber, $g^*(\lambda)$ indicates a gain coefficient at the wavelength $\lambda$ of the amplification optical fiber, $\alpha(\lambda)$ indicates an absorption coefficient at the wavelength $\lambda$ of the amplification optical fiber, $n_2(z)$ indicates density of the amplification medium in an excited state at the position z, and $n_1(z)$ indicates density of the amplification medium at a ground state at the position z. The parameters $g^*(\lambda)$ and $\alpha(\lambda)$ are inherent in the amplification optical fiber. Quantities $n_2(z)$ and $n_1(z)$ depend on excited state, operation state or the like of the amplification optical fiber.

As described above, the amplification gains of the core portions 11 to 17 and 21 to 27 herein in the multi-core optical amplifying fibers 10 and 20 have deviations. For example, an amplification gain per unit length has an approximately 0.15 B/m of deviation in a predetermined excited state and at a predetermined wavelength. Therefore, if the multi-core optical amplifying fibers 10 and 20 are 5 m in length respectively, an approximately 1.5 dB of deviation may occur in the amplification gain for the total length of the multi-core optical amplifying fiber 10 and the multi-core optical amplifying fiber 20 connected together.

In contrast, in the multi-core optical amplifying fiber device 100 according to present Embodiment 1, the connection portion 30 connects the core portions so that deviation of amplification gain for the total length of the core portions, connected to each other, of the multi-core optical amplifying fibers 10 and 20 is restrained between the every connected core portions.

For example, in a case of connecting the core portion 11 to core portion 21, the core portion 12 to the core portion 22, . . . and the core portion 17 to the core portion 27, as described above, the amplification gain for the total length of the multi-core optical amplifying fiber 10 and the multi-core optical amplifying fiber 20 connected together is supposed to have an approximately 1.5 dB of deviation at a certain wavelength. In this case, the connection portion 30 connects the core portions in combination, such as the core portion 11 and the core portion 22, the core portion 12 and the core portion 24 . . . , which restrains deviation of the amplification gain for the total length. Hereby the multi-core optical amplifying fiber device 100 restraining deviation of the amplification gain which the multi-core optical amplifying fibers 10 and 20 originally have is achieved.

For combinations of the core portions 11 to 17 and the core portions 21 to 27 in the multi-core optical amplifying fiber device 100, it is preferable that the core portions be connected to each other so as to restrain deviation of average gain coefficient for the total length of the core portions connected to each other between the every connected core portions. Alternatively, the core portions may be connected to each other so that deviation of amplification gain for the total length of the core portions connected to each other between the every connected core portions in consideration of excited state and operation state when using the multi-core optical amplifying fiber device 100 in the optical fiber amplifier. In order to achieve this, for example, a core portion of which average gain coefficient (or amplification gain) is minimum at a side of the multi-core optical amplifying fiber 20 may be connected to a core portion of which average gain coefficient (or amplification gain) is maximum at a side of the multi-core optical amplifying fiber 10. A core portion of which average gain coefficient (or amplification gain) is maximum at a side of the multi-core optical amplifying fiber 20 may be connected to a core portion of which average gain coefficient (or amplification gain) is minimum at a side of the multi-core optical amplifying fiber 10. Core portions, of which average gain coefficients (or amplification gains) are the closest to the median in a same optical fiber, of the both multi-core optical amplifying fiber 10 and multi-core optical amplifying fiber 20 may be connected to each other.

Although it is preferable that the value of deviation of restrained amplification gain be as small as possible, preferable value differs based on specification or the like required for the multi-core optical amplifying fiber device 100. For example, it is preferable that the value of deviation be within 1 dB, within 0.5 dB is more preferable, and within 0.1 dB is further more preferable. It is preferable that a wavelength or a wavelength bandwidth at which deviation of amplification gain is restrained correspond to wavelength or wavelength bandwidth of a signal light which is to be input in an operation state.

Embodiment 2

FIG. 3 is a schematic view of configuration of a multi-core optical amplifying fiber device according to Embodiment 2 of the present invention. A multi-core optical amplifying fiber device 100A according to Embodiment 2 has a configuration replacing the connection portion 30 in the configuration of the multi-core optical amplifying fiber device 100 according to Embodiment 1 with a connection portion 30A.

The connection portion 30A is configured by rotating each the multi-core optical amplifying fiber 10 and the multi-core optical amplifying fiber 20 to each other and connecting the rotated fibers directly by fusion-splicing or the like.

In the multi-core optical amplifying fiber device 100A, one of the multi-core optical amplifying fibers is rotated around the center axis by 60 degrees from a state in which the core portion 11 faces the core portion 21, the core portion 12 faces the core portion 22 . . . , and the core portion 17 faces the core portion 27, to connect the core portion 11 to the core portion 21, the core portion 12 to the core portion 22 . . . , and the core portion 17 to the core portion 27. Hereby deviation of amplification gain for the total length of the multi-core optical amplifying fiber 10 and the multi-core optical amplifying fiber 20 connected together is restrained. As a result, a multi-core optical amplifying fiber device is achieved in which deviations of amplification gains that the multi-core optical amplifying fibers 10 and 20 originally and respectively have are restrained. The rotation angle is not limited to 60 degrees, and it may be any rotation angle at which deviation of amplification gain for the total length of the multi-core optical amplifying fiber 10 and the multi-core optical amplifying fiber 20 connected together is restrained.

Embodiment 3

Figure 4:
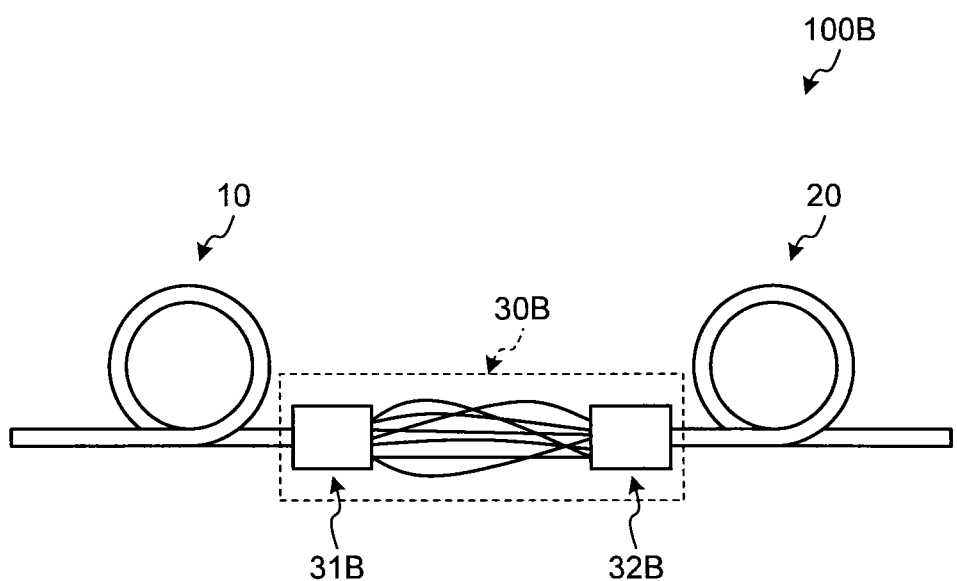
FIG. 4 is a schematic view of configuration of a multi-core optical amplifying fiber device according to Embodiment 3.

FIG. 4 is a schematic view of configuration of a multi-core optical amplifying fiber device according to Embodiment 3 of the present invention. A multi-core optical amplifying fiber device 100B according to present Embodiment 3 has a configuration replacing the connection portion 30 in the configuration of the multi-core optical amplifying fiber device 100 according to Embodiment 1 with a connection portion 30B.

Figure 5:
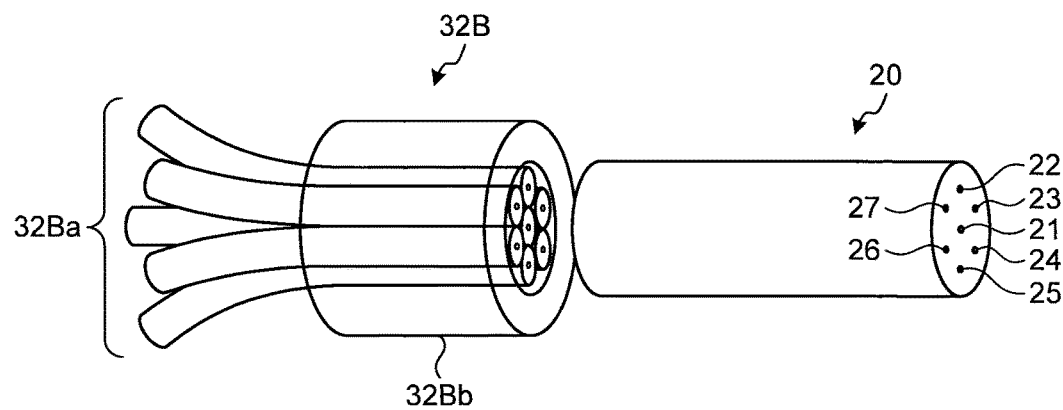
FIG. 5 is a schematic view of configuration of an optical fiber bundle shown in FIG. 4.

The connection portion 30B is configured by optical fiber bundles 31B and 32B. FIG. 5 is a schematic view of configuration of the optical fiber bundle 32B. The optical fiber bundle 32B has seven single-core optical fibers 32Ba and a bundle portion 32Bb bundling the seven single-core optical fibers 32Ba. Each single-core optical fiber 32Ba is provided with a core portion and a cladding portion formed at an outer periphery of the core portion. The bundle portion 32Bb bundles the seven single-core optical fibers 32Ba in a state where six single-core optical fibers are disposed to form a regular hexagon around one single-core optical fiber. Core portions of the seven single-core optical fibers 32Ba are connected to the core portions 21 to 27 of the multi-core optical amplifying fiber 20 respectively. The optical fiber bundle 31B as well has a configuration similar to that of the optical fiber bundle 32B. Core portions of the seven single-core optical fibers that the optical fiber bundle 31B has are connected to the core portions 11 to 17 of the multi-core optical amplifying fiber 10 respectively.

The single-core optical fibers that the optical fiber bundle 31B has are connected to the single-core optical fibers that the optical fiber bundle 32B has. The connection of the multi-core optical amplifying fibers 10 and 20 is conducted so that deviation of amplification gain for the total length of the core portions connected to each other via the single-core optical fiber between the every connected core portions is restrained. Herein, respective core portions may be combined so that, the core portions being at a side of the multi-core optical amplifying fiber 10 in descending order of average gain coefficients (or amplification gains) are made correspond to, and made connect to, the core portions being at a side of the multi-core optical amplifying fiber 20 in ascending order of average gain coefficients (or amplification gains).

In the multi-core optical amplifying fiber device 100B, combinations of the single-core optical fibers that the optical fiber bundle 31B has and the single-core optical fibers that the optical fiber bundle 32B has can be selected arbitrarily with a high degree of freedom. Therefore the multi-core optical amplifying fiber device is achieved which restrains more deviation of amplification gain for the total length of the multi-core optical amplifying fiber 10 and the multi-core optical amplifying fiber 20 connected together.

Embodiment 4

Figure 6:
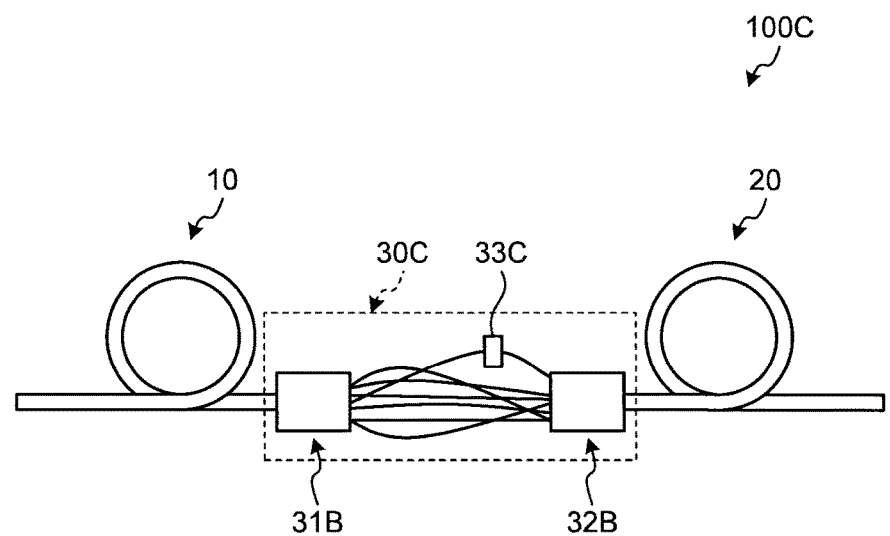
FIG. 6 is a schematic view of configuration of a multi-core optical amplifying fiber device according to Embodiment 4.

FIG. 6 is a schematic view of configuration of a multi-core optical amplifying fiber device according to Embodiment 4 of the present invention. A multi-core optical amplifying fiber device 100C according to present Embodiment 4 has a configuration replacing the connection portion 30B in the configuration of the multi-core optical amplifying fiber device 100B according to Embodiment 3 with a connection portion 30C.

In the connection portion 30C, a certain single-core optical fiber that the optical fiber bundle 31B has is connected to a certain single-core optical fiber which the optical fiber bundle 32B has in a state where an optical loss portion 33C is inserted in the configuration of the connection portion 30B.

The multi-core optical amplifying fiber device 100C realizes the multi-core optical amplifying fiber device which further restrains deviation of amplification gain for the total length of the multi-core optical amplifying fiber 10 and the multi-core optical amplifying fiber 20 connected together by the optical loss portion 33C. For example, the optical loss portion 33C is inserted between single-core optical fibers, among the core portions of the multi-core optical amplifying fibers 10 and 20, connecting the core portions of which gain coefficients are high. Hereby deviation of amplification gain can be further restrained since the maximum value of core portions of which amplification gains are high for the total length is reduced. The optical loss portion 33C may be realized by connecting the single-core optical fibers, which are to be connected to each other, of the optical fiber bundles 31B and 32B in a state where connection loss has been adjusted. The connection as such can be realized by fusion-splicing the single-core optical fibers in a state where optical axes are shifted by a predetermined degree.

Embodiment 5

Figure 7:
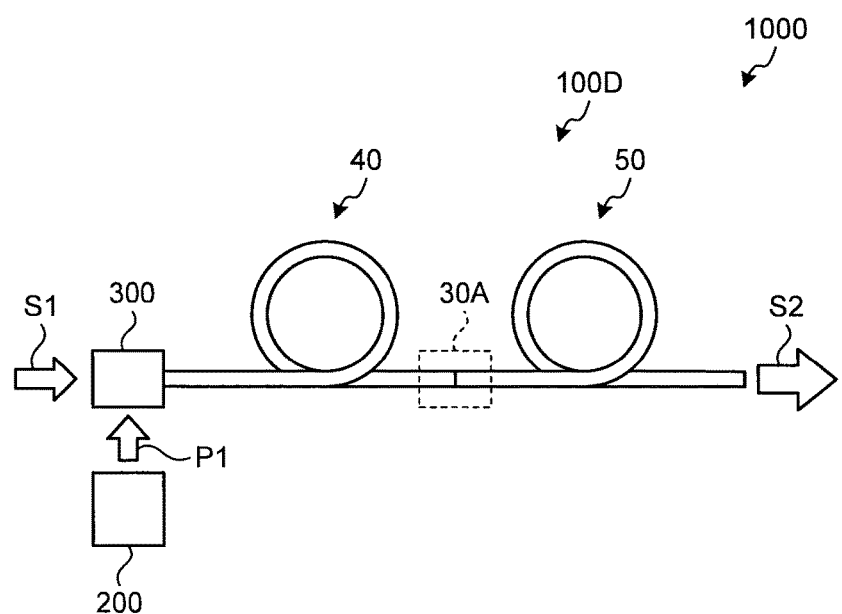
FIG. 7 is a schematic view of configuration of a multi-core optical fiber amplifier according to Embodiment 5.

FIG. 7 is a schematic view of configuration of an multi-core optical fiber amplifier according to Embodiment 5 of the present invention. A multi-core optical fiber amplifier 1000 according to present Embodiment 5 includes a multi-core optical amplifying fiber device 100D, a pumping light source 200, and an optical multiplexer 300.

The multi-core optical amplifying fiber device 100D includes a multi-core optical amplifying fiber 40, a multi-core optical amplifying fiber 50, and the connection portion 30A connecting the multi-core optical amplifying fiber 50 to the multi-core optical amplifying fiber 40.

Figure 8A:
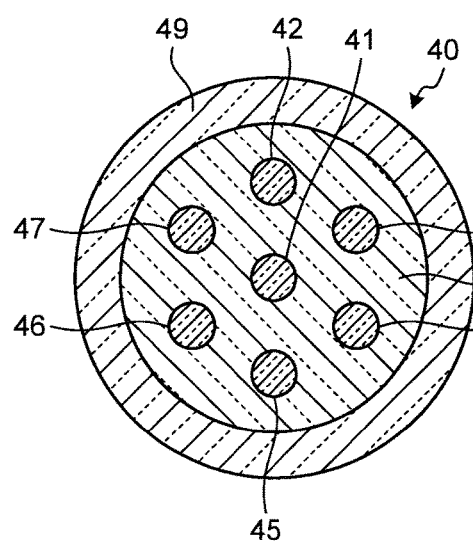
FIG. 8A, 8B are schematic cross-sectional views of a multi-core optical amplifying fibers shown in FIG. 7.
Figure 8B:
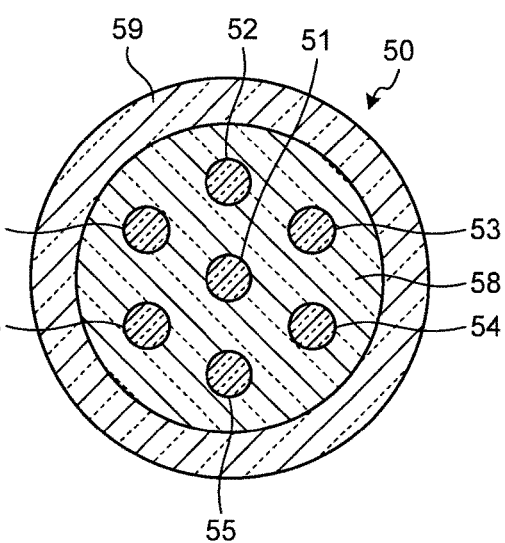

FIG. 8A, 8B are schematic cross-sectional views of the multi-core optical amplifying fibers 40 and 50 shown in FIG. 7. FIG. 8A shows a cross section of the multi-core optical amplifying fiber 40, and FIG. 8B shows a cross section of the multi-core optical amplifying fiber 50.

As shown in FIG. 8A, the multi-core optical amplifying fiber 40 includes seven core portions 41 to 47, an inner cladding portion 48 formed at outer peripheries of the core portions 41 to 47, and an outer cladding portion 49 formed at an outer periphery of the inner cladding portion 48. In the inner cladding portion 48, the core portion 41 is disposed at an approximate center axis of the multi-core optical amplifying fiber 40. The core portions 42 to 47 are disposed around the core portion 41 so as to form a regular hexagon of which the core portion 41 is centered.

The core portions 41 to 47 are made of silica-based glass and doped with rare-earth metal as an amplification medium and with refractive-index-adjusting dopant. The inner cladding portion 48 is configured by a material of which refractive index is lower than those of the core portions 41 to 47 and for example, made of silica glass not containing refractive-index-adjusting dopant. The outer cladding portion 49 is configured by a material, for example resin, of which refractive index is lower than that of the inner cladding portion 48.

Similarly, as shown in FIG. 8B, the multi-core optical amplifying fiber 50 includes seven core portions 51 to 57, an inner cladding portion 58 formed at outer peripheries of the core portions 51 to 57, and an outer cladding portion 59 formed at an outer periphery of the inner cladding portion 58. In the inner cladding portion 58, the core portion 51 is disposed at an approximate center axis of the multi-core optical amplifying fiber 50. The core portions 52 to 57 are disposed around the core portion 51 so as to form a regular hexagon of which the core portion 51 is centered.

The core portions 51 to 57 are made of silica-based glass and doped with rare-earth metal as an amplification medium and with refractive-index-adjusting dopant. The inner cladding portion 58 is configured by a material of which refractive index is lower than those of the core portions 51 to 57 and for example, made of silica glass not containing refractive-index-adjusting dopant. The outer cladding portion 59 is configured by a material, for example resin, of which refractive index is lower than that of the inner cladding portion 58.

As described above, the multi-core optical amplifying fibers 40 and 50 have so-called double-cladding structures.

The connection portion 30A connects one of the core portions 41 to 47 of the multi-core optical amplifying fiber 40 to one of the core portions 51 to 57 of the multi-core optical amplifying fiber 50 each other. More specifically, similarly to the case of Embodiment 2, the connection portion 30A is configured by rotating each the multi-core optical amplifying fiber 40 and the multi-core optical amplifying fiber 50 and connecting the two rotated optical fibers 40 and 50 directly by fusion-splicing or the like. This rotation angle may be any rotation angle restraining deviation of amplification gain for the total length of the multi-core optical amplifying fiber 40 and the multi-core optical amplifying fiber 50 connected together.

The pumping light source 200 including, for example, a semiconductor laser element outputs a pumping light P1 which is to be inputted to the core portions 41 to 47 and 51 to 57 of the multi-core optical amplifying fibers 40 and 50 included in the multi-core optical amplifying fiber device 100D. The pumping light P1 is a pumping light at a wavelength at which the amplification medium doping the core portions 41 to 47 and 51 to 57 can be subjected to optical pumping.

The optical multiplexer 300 makes the pumping light P1 be inputted to the core portions 41 to 47 of the multi-core optical amplifying fiber 40 and makes a signal light group S1 including the seven signal lights inputted from outside to the core portions 41 to 47.

Figure 9:
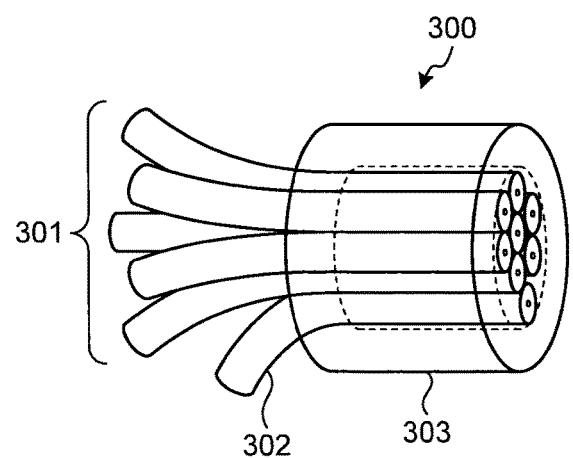
FIG. 9 is a schematic view of an optical multiplexer shown in FIG. 7.

The FIG. 9 is a schematic view of Configuration Example 1 of an optical multiplexer shown in FIG. 7. The optical multiplexer 300 is a optical fiber bundle having seven single-core optical fibers 301, a single-core optical fiber 302, and a bundle portion 303 bundling the single-core optical fibers 301 and 302. The bundle portion 303 bundles the seven single-core optical fibers 301 in a state where the single-core optical fiber 302 is disposed around a bundled state of the six single-core optical fibers disposed around the single-core optical fiber to form a regular hexagon. Core portions of the seven single-core optical fibers 301 are connected to the core portions 41 to 47 of the multi-core optical amplifying fiber 40 respectively. The single-core optical fiber 302 is connected to the inner cladding portion 48 of the multi-core optical amplifying fiber 40 optically.

Hereafter, an operation of this multi-core optical fiber amplifier 1000 will be explained. At first, the pumping light source 200 outputs a pumping light P1. The optical multiplexer 300 receives inputs of the pumping light P1 and the signal light group S1.

In the optical multiplexer 300, the seven single-core optical fibers 301 make the signal lights included in the signal light group S1 input to the core portions 41 to 47 respectively. On the other hand, the single-core optical fiber 302 makes the pumping light P1 from the pumping light source 200 input to the inner cladding portion 48.

In the multi-core optical amplifying fiber device 100D, the pumping light P1 is inputted to the core portions 41 to 47 at first in the multi-core optical amplifying fiber 40 while being propagated through the inner cladding portion 48 by a refractive index difference between the inner cladding portion 48 and the outer cladding portion 49, pumps the amplification medium doping the core portions 41 to 47 optically, and makes the core portions 41 to 47 be capable of optical amplification. After that, the pumping light P1 is inputted to the multi-core optical amplifying fiber 50 via the connection portion 30A, and inputted to the core portions 51 to 57 while being propagated through the inner cladding portion 58 by the refractive index difference of the inner cladding portion 58 and the outer cladding portion 59, pumps the amplification medium doping the core portions 51 to 57 optically, and makes the core portions 51 to 57 be capable of optical amplification. As described above, the multi-core optical fiber amplifier 1000 is a cladding-pumping-type optical fiber amplifier.

On the other hand, the respective signal lights included in the signal light group S1 are propagated, while being subjected to optical amplification, through the core portions inputted thereto, then inputted to the core portions 51 to 57, in states capable of optical amplification, of the multi-core optical amplifying fiber 50 connected to each of the core portions 41 to 47 via the connection portion 30A. Each signal light is propagated while being subjected to optical amplification at each core portion, and outputted as an optically amplified signal light group S2 from an end, at a right-hand-side in the drawing, of the multi-core optical amplifying fiber 50. As described above, the multi-core optical fiber amplifier 1000 is a forward-pumping-type optical fiber amplifier propagating the pumping light and the signal light in the same direction.

In the multi-core optical fiber amplifier 1000 according to present Embodiment 5, as shown in Embodiment 2, the connection portion 30A of the multi-core optical amplifying fiber device 100D connects the core portions so that deviation of amplification gain for the total length of the core portions connected to each other, of the multi-core optical amplifying fibers 40 and 50 is restrained between the every connected core portions. Hereby the multi-core optical fiber amplifier 1000 restrains deviation of amplification gain relative to deviation of amplification gain that the multi-core optical amplifying fibers 40 and 50 have originally and respectively.

Figure 10:
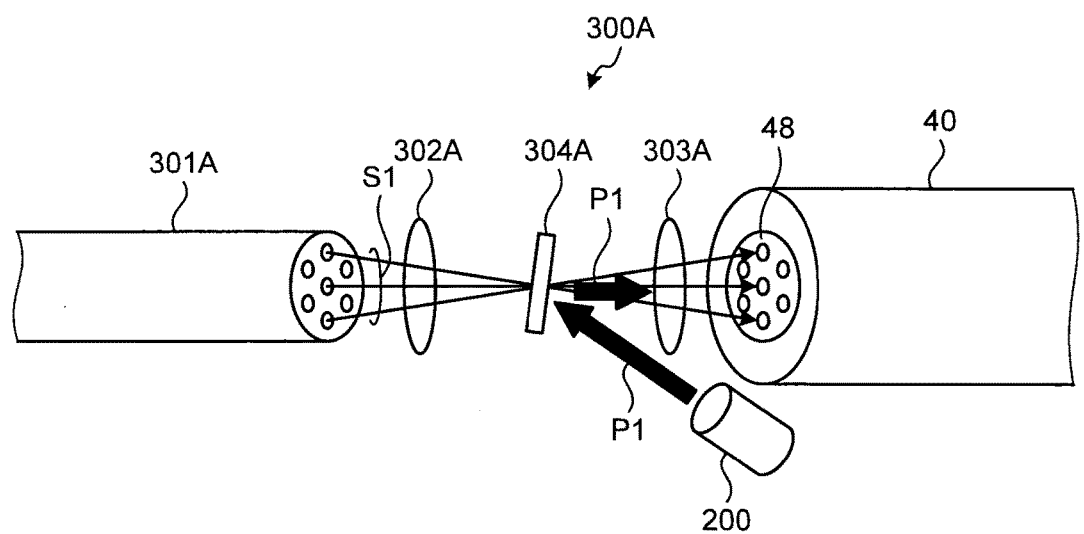
FIG. 10 is a schematic view of Example of another configuration of an optical multiplexer.

Although the optical multiplexer 300 shown in FIG. 9 is configured by an optical fiber bundle, a configuration of the optical multiplexer is not limited to this. FIG. 10 is a schematic view of another configuration example of an optical multiplexer. An optical multiplexer 300A has a multi-core optical fiber 301A, lenses 302A and 303A, and an optical filter 304A.

The multi-core optical fiber 301A has six core portions disposed to form a regular hexagon around a core portion similarly to the multi-core optical amplifying fiber 40. However, each core portion is not doped with amplification medium. The lenses 302A and 303A are disposed in serial between the multi-core optical fiber 301A and the multi-core optical amplifying fiber 40. The optical filter 304A disposed between the lens 302A and the lens 303A has wavelength characteristics that reflect the pumping light P1 and transmit the signal light group S1 therethrough.

In this optical multiplexer 300A, the multi-core optical fiber 301A guides at each core portions, and outputs therefrom, each signal light included in the signal light group S1 inputted from outside. FIG. 10 shows only three among seven signal lights included in the signal light group S1. The lenses 302A and 303A make the signal lights included in the signal light group S1 outputted from the multi-core optical fiber 301A be coupled optically to predetermined core portions of the multi-core optical amplifying fiber 40 respectively.

On the other hand, the optical filter 304A transmits the signal light group S1 therethrough and reflects the pumping light P1 outputted from the pumping light source 200 to a side of the lens 303A. The lens 303A makes the pumping light P1 be coupled to the inner cladding portion 48 of the multi-core optical amplifying fiber 40 optically. As described above, the optical multiplexer 300A is a spatial-coupling-type optical multiplexer.

Figure 11:
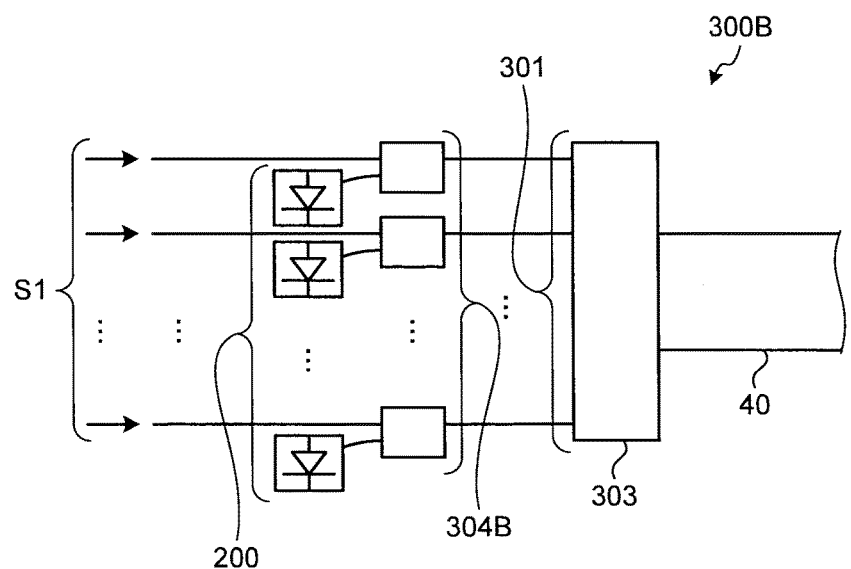
FIG. 11 is a schematic view of Example of still another configuration of an optical multiplexer.

Although the optical multiplexers 300 and 300A shown in FIGS. 9 and 10 are cladding-portion-pumping optical multiplexers, the configuration of the optical multiplexer is not limited to this. FIG. 11 is a schematic view of another configuration example of an optical multiplexer. The optical multiplexer 300B has a configuration in which, a WDM optical multiplexer 304B is added to, and one of the single-core optical fibers 302 is deleted from, the configuration of the optical multiplexer 300 shown in FIG. 9.

The WDM optical multiplexers 304B are provided to the seven single-core optical fibers 301 respectively. On the other hand, the pumping light source 200 is configured by semiconductor laser elements each of which is connected to each WDM optical multiplexer 304B. In this optical multiplexer 300B,
each WDM optical multiplexer 304B multiplexes each signal light being included in the signal light group S1 inputted from outside and propagated through each one of the seven single-core optical fibers 301 with a pumping light (for example, single-mode) outputted from each one of the semiconductor laser elements constituting the pumping light source 200. Therefore, the multiplexed signal light and the pumping light are inputted to each one of the core portions 41 to 47 of the multi-core optical amplifying fiber 40. The optical multiplexer 300B as such can be used when configuring a so-called end-pumping-type multi-core optical fiber amplifier.

Embodiment 6

Figure 12:
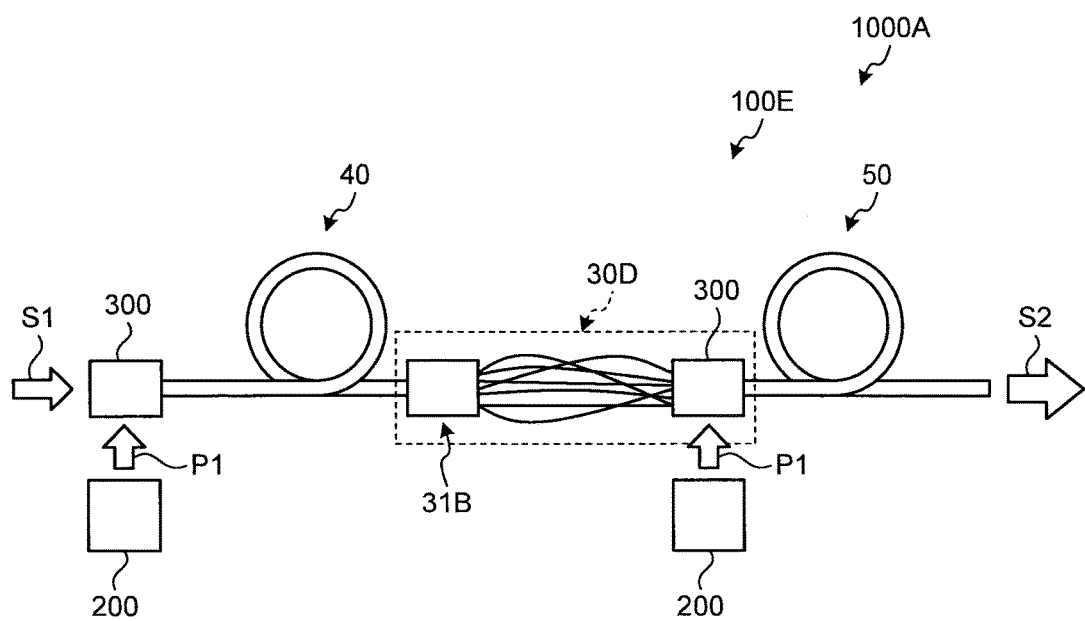
FIG. 12 is a schematic view of configuration of a multi-core optical fiber amplifier according to Embodiment 6.

FIG. 12 is a schematic view of configuration of a multi-core optical fiber amplifier according to Embodiment 6 of the present invention. A multi-core optical fiber amplifier 1000A according to present Embodiment 6 has a configuration replacing the multi-core optical amplifying fiber device 100D in the configuration of the multi-core optical fiber amplifier 1000 according to Embodiment 5 with a multi-core optical amplifying fiber device 100E and adding a pumping light source 200.

The multi-core optical amplifying fiber device 100E has a configuration replacing the connection portion 30B with a connection portion 30D in the configuration of the multi-core optical amplifying fiber device 100B shown in FIG. 4. The connection portion 30D has a configuration replacing the optical fiber bundle 32B of the connection portion 30B with the optical multiplexer 300 shown in FIG. 9. The additional pumping light source 200 is connected to this optical multiplexer 300.

In this multi-core optical fiber amplifier 1000A, the multi-core optical amplifying fibers 40 and 50 have a configuration in which the multi-core optical amplifying fibers 40 and 50 are subjected to forward pumping by the pumping light P1 outputted from the pumping light source 200 via the optical multiplexers 300 connected to the multi-core optical amplifying fibers 40 and 50 respectively.

Embodiment 7

Figure 13:
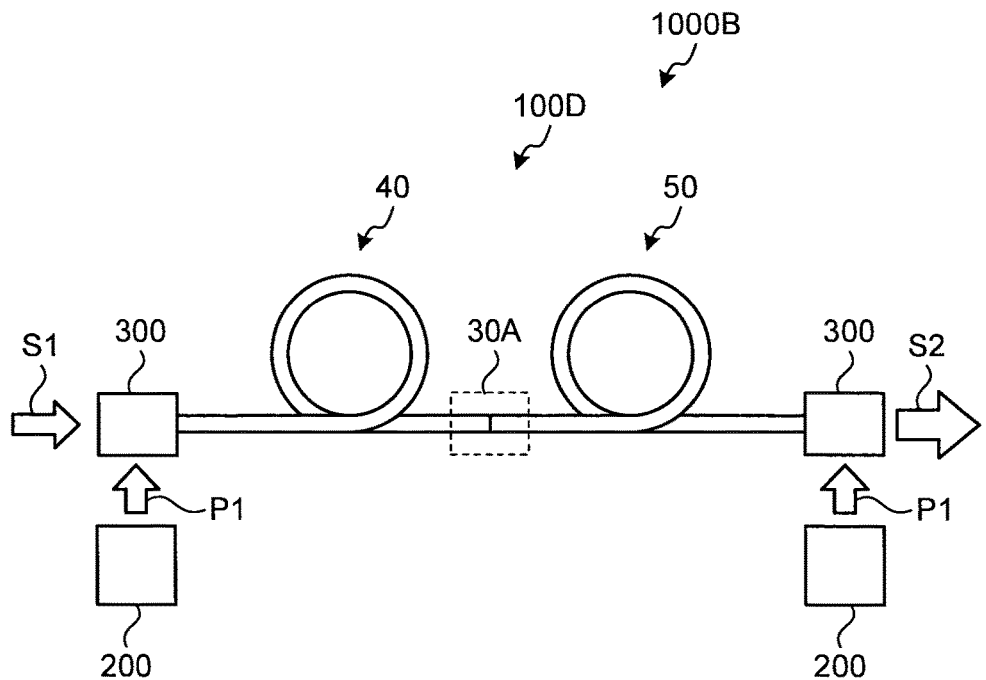
FIG. 13 is a schematic view of configuration of a multi-core optical fiber amplifier according to Embodiment 7.

FIG. 13 is a schematic view of configuration of a multi-core optical fiber amplifier according to Embodiment 7. The multi-core optical fiber amplifier 1000B according to present Embodiment 7 has a configuration adding the optical multiplexer 300 and the pumping light source 200 to the configuration of the multi-core optical fiber amplifier 1000 according to Embodiment 5.

The additional optical multiplexer 300 and the pumping light source 200 are provided to a side, near the multi-core optical amplifying fiber 50, of the multi-core optical amplifying fiber device 100D. The additional pumping light source 200 outputs the pumping light P1 and inputs the pumping light P1 to the multi-core optical amplifying fiber 50 via the additional optical multiplexer 300.

In this multi-core optical fiber amplifier 1000B, the multi-core optical amplifying fibers 40 and 50 have configurations of being subjected to forward pumping and backward pumping respectively by the pumping light P1 outputted from the pumping light source 200 via the optical multiplexer 300 connected to the multi-core optical amplifying fibers 40 and 50. The connection portion 30A may be replaced with the connection portion 30B shown in FIG. 4 and the connection portion 30 shown in FIG. 6.

Herein multi-core optical fiber amplifiers as Comparison Examples and Examples according to the present invention were produced to measure their optical amplification characteristics.

Figure 14:
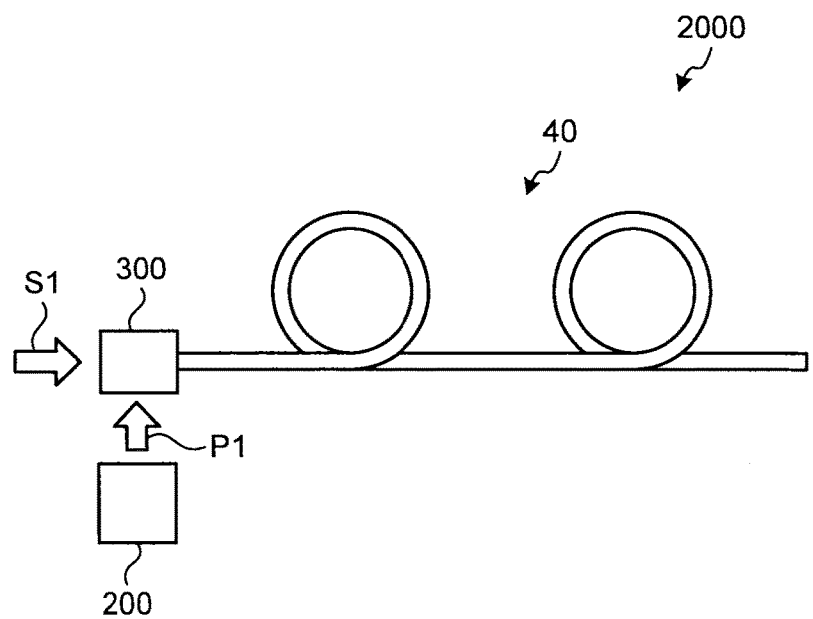
FIG. 14 is schematic view of configuration of a multi-core optical fiber amplifier according to Comparison Example.

FIG. 14 is a schematic view of configuration of a multi-core optical fiber amplifier according to Comparison Example. This multi-core optical fiber amplifier 2000 has a configuration replacing the multi-core optical amplifying fiber device 100D with the multi-core optical amplifying fiber 40 in the configuration of the multi-core optical fiber amplifier 1000 shown in FIG. 7, and using an optical multiplexer 300B shown in FIG. 11 as the optical multiplexer 300. A distance between every two core portions of the multi-core optical amplifying fiber 40 is 45 μm, and each core portion has the following characteristics:

diameter: 3 μm; relative refractive-index difference (Δ) of core portion relative to cladding portion: 1.4%; Er concentration: 1500 wtppm; Al concentration: 1.6 wt %; and length of multi-core optical amplifying fiber 40: 8 m. The pumping light source 200 was configured by a semiconductor laser element outputting the pumping light P1 at a wavelength of 980 nm. After that, power of the pumping light P1 being inputted to each core portion of the multi-core optical amplifying fiber 40 in this state was set at 500 mW, seven signal lights (hereafter signal lights of 1 ch to 7 ch) as a signal light group S1 from the optical multiplexer 300B are inputted to each of the core portions 41 to 47 of the multi-core optical amplifying fiber 40 to be subjected to optical amplification, and their amplification gains were measured.

On the other hand, a multi-core optical fiber amplifier which is configured similarly to the multi-core optical fiber amplifier 1000A shown in FIG. 12 was produced as a multi-core optical fiber amplifier according to Examples. The optical multiplexer 300B shown in FIG. 11 was used as the optical multiplexer 300. Herein the multi-core optical amplifying fiber 40 as the Comparison Example and the multi-core optical amplifying fibers 40 and 50 as the Example were used by dividing a multi-core optical amplifying fiber continuously drawn from a same optical fiber preform. Lengths of the multi-core optical amplifying fibers 40 and 50 in the Example were equal at 4 m. Therefore, corresponding core portions (for example, the core portion 41 and the core portion 51, and the core portion 42 and the core portion 52 or the like) in the multi-core optical amplifying fibers 40 and 50 of the example have approximately the same gain coefficients, gain coefficients differ between every core portions (for example, the core portion 41 and the core portion 42). Thereby, in the multi-core optical amplifying fiber device of the multi-core optical fiber amplifier according to the Example, core portions were connected as follows so that amplification gains at the seven core portion become more equalized by the connection portion 30D configured by the optical fiber bundle. That is, connected respectively were the core portion 41 and the core portion 54; the core portion 42 and the core portion 57; the core portion 43 and the core portion 56; the core portion 44 and the core portion 51; the core portion 45 and the core portion 55; the core portion 46 and the core portion 53; and the core portion 47 and the core portion 52. Then, the power of the pumping light P1 being inputted to each core portion of the multi-core optical amplifying fiber 40 was set at 500 mW, seven signal lights (hereafter signal lights of 1 ch to 7 ch) as the signal light group S1 were inputted from the optical multiplexer 300B and from sides, at each of the core portions 41 to 47, of the multi-core optical amplifying fiber 40 and subjected to optical amplification by each of the core portions 41 to 47 and 51 to 57 of the multi-core optical amplifying fibers 40 and 50, and amplification gains thereof were measured.

Figure 15:
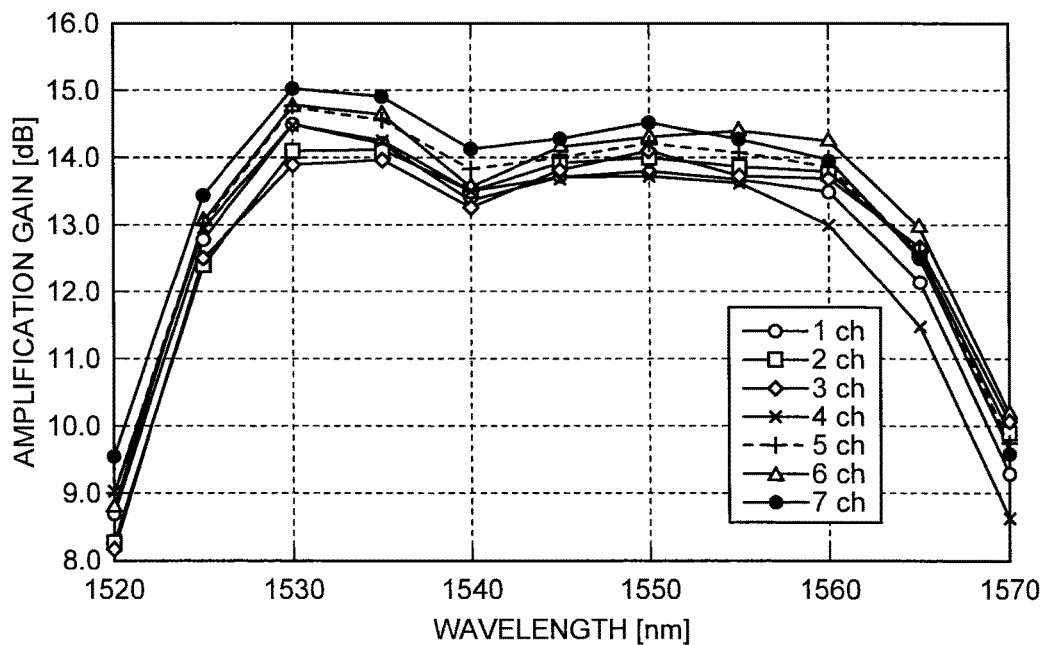
FIG. 15 is a view showing dependency, on wavelength, of amplification gain of the multi-core optical fiber amplifier according to Comparison Example.
Figure 16:
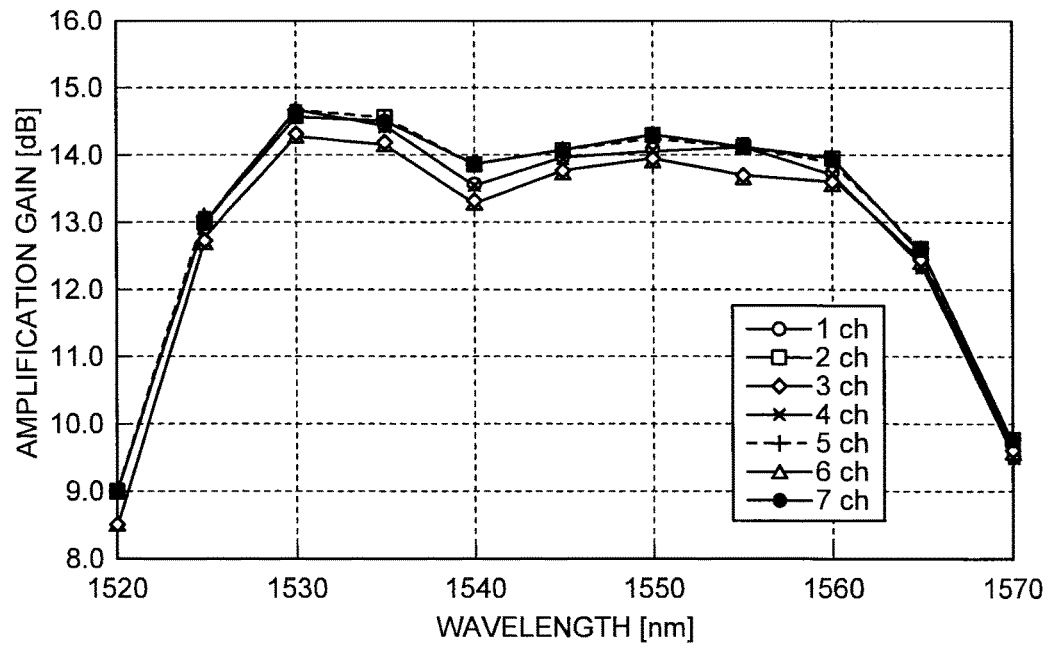
FIG. 16 is a view showing dependency, on wavelength, of amplification gain of the multi-core optical fiber amplifier according to Example.
Figure 17:
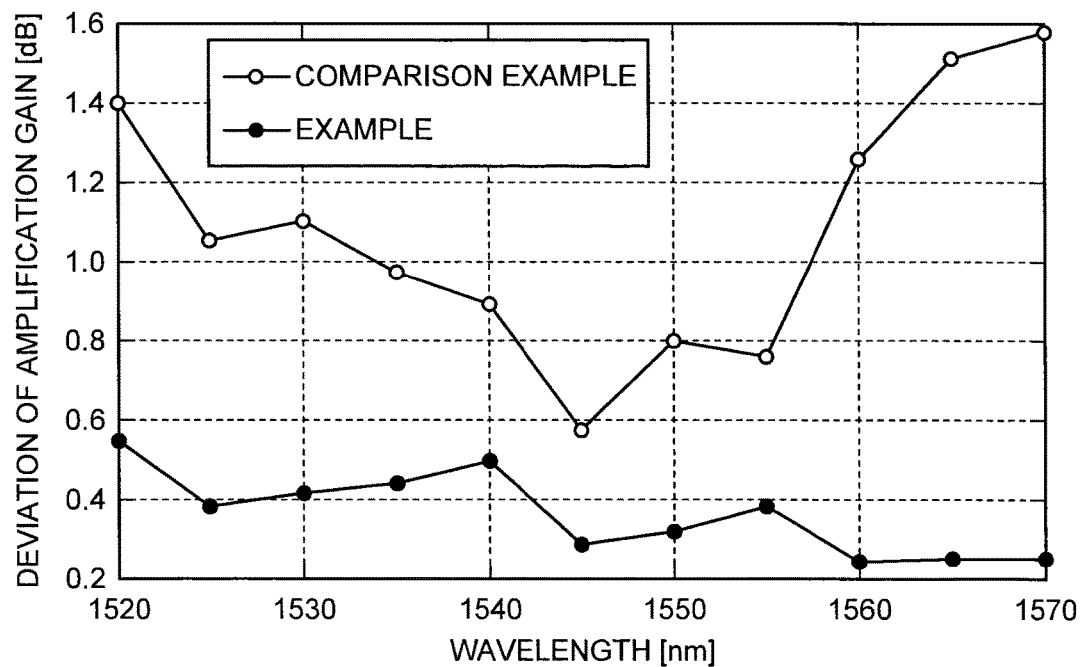
FIG. 17 is a view showing dependency, on wavelength, of amplification gain's deviation of the multi-core optical fiber amplifier according to Comparison Example and Example.

FIG. 15 is a view showing dependency, on wavelength, of amplification gain of the multi-core optical fiber amplifier according to Comparison Example. FIG. 16 is a view showing dependency, on wavelength, of amplification gain of the multi-core optical fiber amplifier according to Example. FIG. 17 is a view showing dependency, on wavelength, of amplification gain of the multi-core optical fiber amplifier according to Comparison Example and Example. FIG. 17 shows deviation between channels of which difference therebetween is the maximum at each wavelength.

As shown in FIG. 17, in case of Comparison Example, deviation of amplification gain at the seven core portions was equal to or greater than 1.5 dB at maximum and approximately 0.6 dB at minimum. In contrast, in case of Example, deviation of amplification gain at the seven core portions were restrained at equal to or lower than 0.6 dB.

Embodiment 8

Although all the core portions of the multi-core optical amplifying fiber were doped with amplification medium in the above-described embodiment, only a part of the core portions may be doped with amplification medium.

Figure 18:
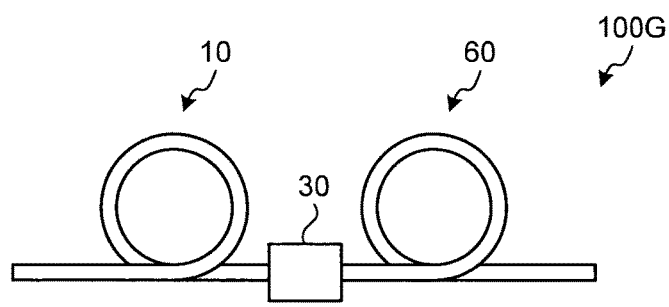
FIG. 18 is a schematic view of configuration of a multi-core optical amplifying fiber device according to Embodiment 8.

FIG. 18 is a schematic view of configuration of a multi-core optical amplifying fiber device according to Embodiment 8 of the present invention. This multi-core optical amplifying fiber device 100G has a configuration replacing the multi-core optical amplifying fiber 20 with a multi-core optical amplifying fiber 60 in the configuration of the multi-core optical amplifying fiber device 100 shown in FIG. 1.

Figure 19:
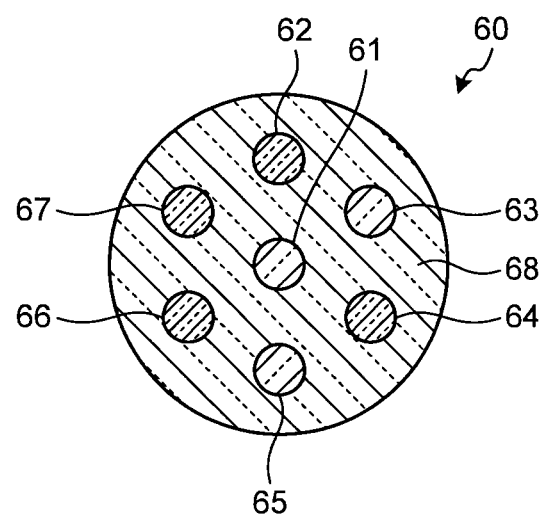
FIG. 19 is a schematic cross-sectional view of a multi-core optical amplifying fiber shown in FIG. 18.

FIG. 19 is a schematic cross-sectional view of the multi-core optical amplifying fiber 60 shown in FIG. 18. The multi-core optical amplifying fiber 60 includes seven core portions 61 to 67 and a cladding portion 68 formed at outer peripheries of the core portions 61 to 67. In the cladding portion 68, the core portion 61 is disposed at an approximate center axis of the multi-core optical amplifying fiber 60. The core portions 62 to 67 are disposed around the core portion 61 so as to form a regular hexagon of which the core portion 61 is centered.

Herein the core portions 62, 64, 66, and 67 are made of silica-based glass and doped with rare-earth metal as an amplification medium and with refractive-index-adjusting dopant. On the other hand, the core portions 61, 63, and 65 are made of silica-based glass and doped with refractive-index-adjusting dopant, but are not doped with amplification medium. The cladding portion 68 is configured by a material of which refractive index is lower than those of the core portions 61 to 67 and for example, made of silica glass not containing refractive-index-adjusting dopant.

As described above, although a part of the core portions of the multi-core optical amplifying fiber 60 constituting the multi-core optical amplifying fiber device 100G is not doped with amplification medium, the connection portion 30 connects the core portions so as to restrain deviation of the amplification gain for the total length of the core portions, connected to each other, of the multi-core optical amplifying fibers 10 and 60. Hereby deviation of the amplification gain between the core portions for the total length of the multi-core optical amplifying fiber device 100G is restrained. For example, deviation of the amplification gain between the core portions for the total length of the multi-core optical amplifying fiber device 100G is restrained by configuring so that the core portions 62, 64, 66, and 67 doped with amplification medium of the multi-core optical amplifying fiber 60 are connected to a core portion, among the core portions 11 to 17 of the multi-core optical amplifying fiber 10, of which gain coefficient is small.

Embodiment 9

Figure 20:
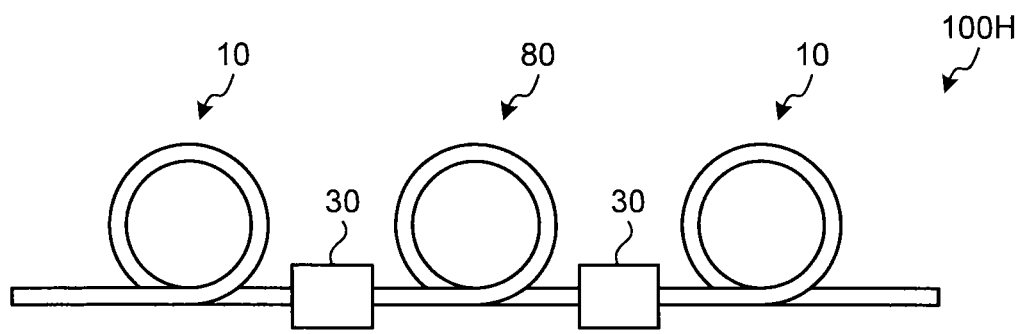
FIG. 20 is a schematic view of configuration of a multi-core optical amplifying fiber device according to Embodiment 9.

FIG. 20 is a schematic view of configuration of a multi-core optical amplifying fiber device according to Embodiment 9 of the present invention. This multi-core optical amplifying fiber device 100H has a configuration in which a multi-core optical amplifying fiber 80 is inserted between the two multi-core optical amplifying fibers 10 and the respective core portions are connected by the connection portion 30.

Figure 21:
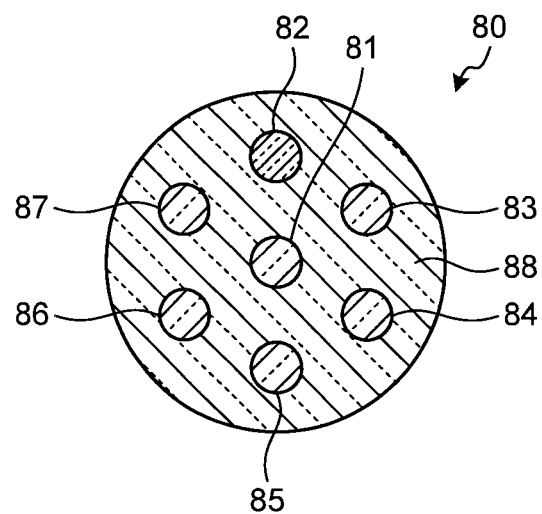
FIG. 21 is a schematic cross-sectional view of a multi-core optical amplifying fiber shown in FIG. 20.

FIG. 21 is a schematic cross-sectional view of the multi-core optical amplifying fiber 80 shown in FIG. 20. The multi-core optical amplifying fiber 80 includes seven core portions 81 to 87 and a cladding portion 88 formed at outer peripheries of the core portions 81 to 87. In the cladding portion 88, the core portion 81 is disposed at an approximate center axis of the multi-core optical amplifying fiber 80. The core portions 82 to 87 are disposed around the core portion 81 so as to form a regular hexagon of which the core portion 81 is centered.

Herein the core portion 82 is made of silica-based glass and doped with rare-earth metal as an amplification medium and with refractive-index-adjusting dopant. On the other hand, the core portions 81 and 83 to 87 are made of silica-based glass and doped with refractive-index-adjusting dopant, but are not doped with amplification medium. The cladding portion 88 is configured by a material of which refractive index is lower than those of the core portions 81 to 87 and for example, made of silica glass not containing refractive-index-adjusting dopant.

As described above, although a part of the core portions of the multi-core optical amplifying fiber 80 constituting the multi-core optical amplifying fiber device 100H is not doped with amplification medium, the connection portion 30 connects the core portions so as to restrain deviation of the amplification gain for the total length of the core portions, connected to each other, of the multi-core optical amplifying fibers 10, 80, and 10. Hereby deviation of the amplification gain between the core portions for the total length of the multi-core optical amplifying fiber device 100H is restrained. For example, deviation of the amplification gain between the core portions for the total length of the multi-core optical amplifying fiber device 100H is restrained by configuring so that the core portion 82 doped with amplification medium of the multi-core optical amplifying fiber 80 is connected to a core portion, among the core portions 11 to 17 of the multi-core optical amplifying fiber 10, of which gain coefficient is small.

Deviation of the amplification gain between the core portions of the multi-core optical amplifying fiber 10 can be adjusted finely by using the multi-core optical amplifying fiber 80 in which only the core portion 82 is doped with amplification medium.

Embodiment 10

Figure 22:
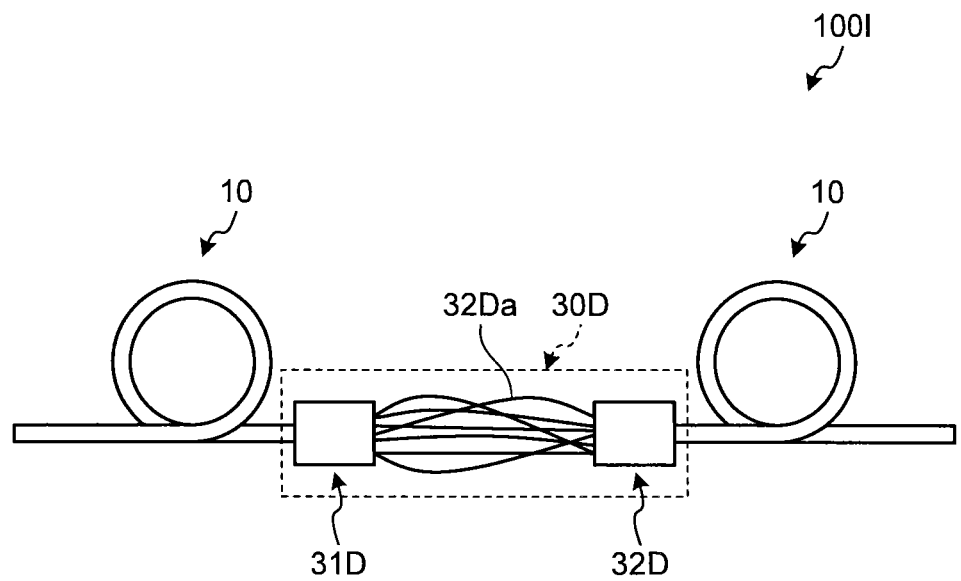
FIG. 22 is a schematic view of configuration of a multi-core optical amplifying fiber device according to Embodiment 10.

FIG. 22 is a schematic view of configuration of a multi-core optical amplifying fiber device according to Embodiment 10 of the present invention. This multi-core optical amplifying fiber device 100I has a configuration in which core portions of the two multi-core optical amplifying fibers 10 are connected by the connection portion 30D respectively.

The connection portion 30D is configured by optical fiber bundles 31D and 32D. The optical fiber bundles 31D and 32D are configured similarly to the optical fiber bundles 31B and 32B shown in FIGS. 4 and 5, in which the single-core optical fiber which the optical fiber bundle 31D has is connected to the single-core optical fiber which the optical fiber bundle 32D has. However, the core portion of the single-core optical fiber 32Da constituting the optical fiber bundle 32D is doped with amplification medium. In this multi-core optical amplifying fiber device 100I, the amplification gain added by the amplification medium doping with the core portion of the single-core optical fiber 32Da restrains deviation of amplification gain between core portions of the multi-core optical amplifying fiber 10.

Although the number of the multi-core optical amplifying fibers being connected is two or three in above-described Embodiments, the number is not limited specifically. Although the seven core portions of the multi-core optical amplifying fibers being connected are disposed at positions of apices and the center of a regular hexagon in the above-described embodiments, the core portions are not limited in the number and the disposition.

Although the multi-core optical amplifying fiber in which all the core portions are doped with amplification medium is connected to the multi-core optical amplifying fiber in which a part of the core portions are doped with amplification medium in the above-described embodiments 9 and 10, multi-core optical amplifying fibers may be connected to each other in each of which a part of core portions is doped with amplification medium. In this case, it is preferable that any core portions be connected so that at least a part of the longitudinal direction is doped with amplification medium to obtain amplification gain for the total length in connected state.

As described above, the multi-core optical amplifying fiber device and the multi-core optical fiber amplifier according to the present invention are useful for an optical transmission system and suitable for WDM transmission system in particular.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core optical amplifying fiber device comprising:
   first and second multi-core optical amplifying fibers each including a plurality of core portions and a cladding portion formed at outer peripheries of the core portions; and
   a connection portion connecting the core portions of the first and second multi-core optical amplifying fibers to one another, wherein
   the core portions of the first multi-core optical amplifying fiber are doped with amplification medium,
   the core portions of the second multi-core optical amplifying fiber comprise a first core portion doped with amplification medium and a second core portion not doped with amplification medium, and
   the connection portion connects the core portions to restrain deviation, between every connected core portions, of amplification gain for a total length of the core portions connected one another with respect to deviation of amplification gain between every connected core portions of the first multi-core optical amplifying fiber.

2. The multi-core optical amplifying fiber device according to claim 1, wherein the connection portion connects the core portions to restrain deviation between every connected core portions and of average gain coefficient for a total length of the core portions connected one another.

3. The multi-core optical amplifying fiber device according to claim 1, wherein the connection portion is configured by connecting the first and second multi-core optical amplifying fibers directly.

4. The multi-core optical amplifying fiber device according to claim 1, wherein the connection portion has a plurality of single-core optical fibers including a core portion and a cladding portion formed at an outer periphery of the core portion, and the core portions of the multi-core optical amplifying fibers are connected to one another via the single-core optical fiber.

5. The multi-core optical amplifying fiber device according to claim 4, wherein an optical loss portion is inserted in the single-core optical fiber.

6. The multi-core optical amplifying fiber device according to claim 4, wherein the core portion of the single-core optical fiber is doped with amplification medium.

7. The multi-core optical amplifying fiber device according to claim 1, wherein, in the second multi-core optical amplifying fiber, only one of the core portions is doped with the amplification medium and other ones of the core portions are not doped with the amplification medium.

8. The multi-core optical amplifying fiber device according to claim 1, wherein, in the second multi-core optical amplifying fiber, only at least two of the core portions are doped with the amplification medium and other ones of the core portions are not doped with the amplification medium.

9. The multi-core optical amplifying fiber device according to claim 1, wherein
the core portions doped with the amplification medium of the second multi-core optical amplifying fiber are connected to at least one of the core portions of the first multi-core optical amplifying fiber, and
gain coefficient of the core portions of the first multi-core optical amplifying fiber connected to the core portions doped with the amplification medium of the second multi-core optical amplifying fiber is small.

10. The multi-core optical amplifying fiber device according to claim 1, wherein the first multi-core optical amplifying fiber comprises two multi-core optical amplifying fibers, and two ends of the second multi-core optical amplifying fiber are connected to the two multi-core optical amplifying fibers respectively.

11. A multi-core optical fiber amplifier comprising:
the multi-core optical amplifying fiber device according to any one of claims 1 to 6 and 7 to 10;
a pumping light source outputting a pumping light made be inputted to the core portion of the multi-core optical amplifying fiber included in the multi-core optical amplifying fiber device; and
an optical multiplexer making the pumping light be inputted to the core portions of the multi-core optical amplifying fiber.

12. The multi-core optical fiber amplifier according to claim 11, wherein
the first multi-core optical amplifying fiber has a double-cladding structure, and
the multi-core optical fiber amplifier is a cladding-pumping optical fiber amplifier in which the pumping light is inputted into an inner cladding portion of the double-cladding structure and which pumps each of the core portions.

* * * * *